April 13, 1965 W. T. HARNETT 3,178,647

DIFFERENCE AMPLIFIER WITH CROSS BIAS NETWORKS FOR INDEPENDENT CURRENT FLOW ADJUSTMENTS

Filed June 21, 1962

INVENTOR
WILLIAM T. HARNETT

BY John F. Ostendorf

ATTORNEY

United States Patent Office 3,178,647
Patented Apr. 13, 1965

3,178,647

DIFFERENCE AMPLIFIER WITH CROSS BIAS NETWORKS FOR INDEPENDENT CURRENT FLOW ADJUSTMENTS

William T. Harnett, Poughkeepsie, N.Y., assignor to International Business Machines Corporation, New York, N.Y., a corporation of New York Filed June 21, 1962, Ser. No. 204,159
8 Claims. (Cl. 330—17)

This invention relates to amplifier circuits and, more particularly, to a difference amplifier having provision for independent adjustment of the current flow through each branch of the circuit.

Ordinarily, servo systems employ a difference amplifier which responds to a sensed error signal and a reference signal to provide differential drive signals for correcting an unbalance or error condition in the servo loop. If a conventional difference amplifier is utilized, the total current supplied through both branches of the circuit is limited to the current available from the common current source of the circuit. Thus, during the quiescent or zero error condition of the servo system, each branch of the amplifier provides about fifty percent of the total available current to drive the servo alternately and equally. During an error condition, the total current available through one branch of the amplifier for making a correction in the servo cannot exceed twice the amount delivered by one branch during the quiescent condition. Consequently, there is insufficient current available for making the servo correction in cases where the values of quiescent current must be set at a low level.

Additionally, conventional difference amplifiers have no provision for exercising independent control over each branch of the circuit, and, therefore, compensation cannot be made for inherent differences that exist in the driven circuits or the servo loop. Similarly, the current source employed in such an amplifier is subject to any variations that occur in the supply voltage of the circuit.

Accordingly, it is a primary object of the invention to provide an improved difference amplifier which permits the current flow through each branch of the amplifier to be adjusted independently.

It is another object of the invention to provide a difference amplifier having provision for independent control of the current in each branch of the amplifier so that either branch can supply many times the quiescent current flow in response to a servo error condition.

It is a further object of the invention to provide a difference amplifier having provision for independently compensating for variations existing between the load circuits driven by the amplifier.

A further object of the invention is to provide a difference amplifier having provision for permitting the current supplied by each branch of the circuit to be independent of any supply voltage variations affecting the circuit.

Still a further object of the invention is to provide a difference amplifier which does not reflect any variations in current flow in response to equal variations of the common mode or zero error signal.

Briefly, the foregoing objects are accomplished by providing a difference amplifier having two amplifying branches for driving independent load circuits. Each branch includes driving means for receiving one of the difference input signals and for controlling amplifying means in both branches. The driving means of one branch acts as a current source for the amplifying means of the same branch and, through connective means including a variable bias network, it controls the conductivity of the amplifying means of the opposite branch. Dependent on the setting of each variable bias means, the quiescent current condition of the respective branches is established, and the current flow through each branch to its load circuit during an error condition is established so as to be proportional to the difference between the two input signals. As a result, each branch of the difference amplifier may have a different value of quiescent current, and the error condition current flow in one branch can equal many times that of its quiescent current.

A feature of the invention is the provision of a difference amplifier having two branches with means in each branch for driving an amplifying means in its own branch and for controlling amplifying means in the opposite branch through a biasing network.

Another feature of the invention is the provision of a cross biasing network for each branch of a differential amplifier including an avalanche breakdown device and a variable impedance for establishing the quiescent current through a branch as a function of the breakdown potential of the device and the value of the variable impedance.

A further feature of the invention is to provide a cross biased differential amplifier which permits the zero error signal current flow in each branch of the amplifier to be adjusted independently by the cross biasing network so as to compensate for the variations that exist in the load circuits driven by the difference amplifier.

The foregoing and other objects, features and advantages of the invention will be apparent from the following more particular description of a preferred embodiment of the invention, as illustrated in the accompanying drawing, wherein.

Figures 1, 3:
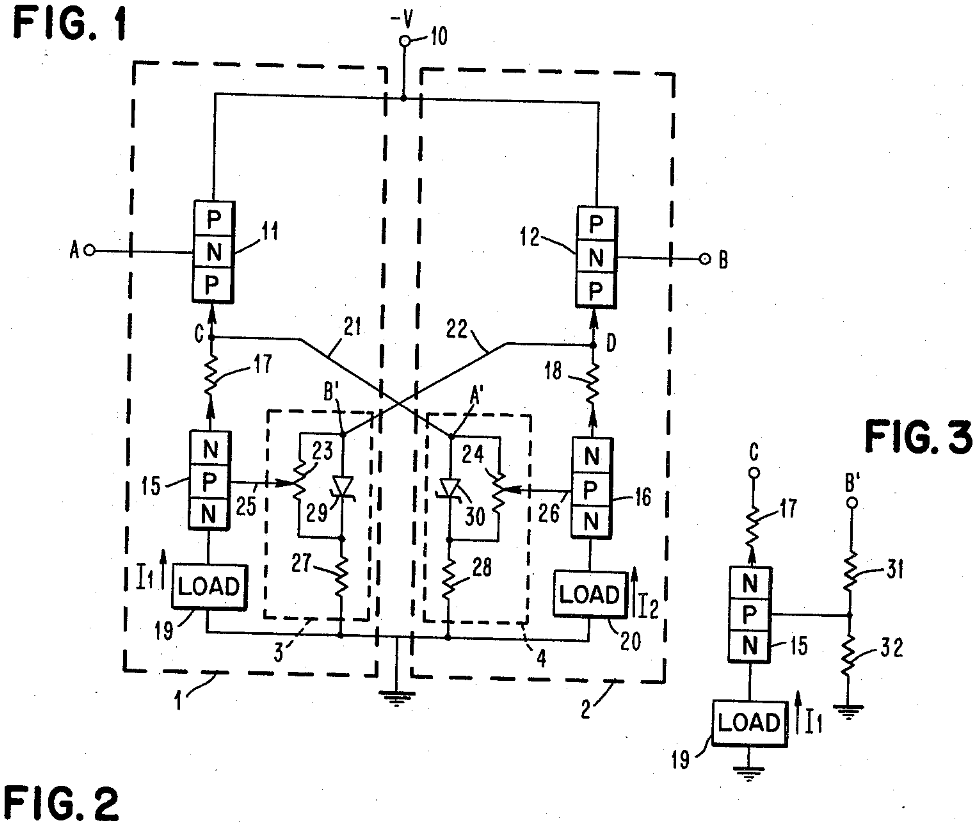
FIGURE 1 is a circuit diagram of a difference amplifier according to the invention.
FIGURES 3 and 4 are circuit diagrams for comparison of the operation of the circuit of FIGURE 1 without and with the avalanche breakdown device of the bias networks.

Referring to FIGURE 1, the difference amplifier embodying the principles of the invention comprises two circuit branches generally indicated at 1 and 2. The branches are interconnected through biasing networks 3 and 4. Each branch includes a PNP transistor 11, 12 connected in common collector configuration to a negative voltage supply connected to terminal 10. Differential input signals A and B are applied to the bases of the transistors 11 and 12, respectively.

An NPN transistor 15 is driven at its emitter by transistor 11 in the branch 1 through a resistor 17; transistor 15 being connected in common base configuration to the biasing network 3. The collector of transistor 15 drives a load circuit 19 which is, in turn, referenced to ground potential. Similarly, an NPN transistor 16 is driven at its emitter by transistor 12 and is connected in common base configuration to the biasing network 4. A load circuit 20 is driven by the collector of transistor 16 and is, in turn, referenced to ground potential.

Although the load circuits 19, 20 are shown in block form, it is to be understood that they are not limited to a particular form but may assume any form. In one application of the difference amplifier circuit, the load circuits are the coils of the magnetic amplifier, and, in another application (described in copending application Serial No. 204,202, filed June 21, 1962, in the name of Pao H. Chin and assigned to the same assignee as this invention) each of the load circuits is a unijunction pulse generator.

Transistors 11 and 12 are also coupled to the nodes A′ and B′ of the biasing networks 4 and 3, respectively, through the connections 21 and 22. The biasing network 3 includes a potentiometer 23 coupled at one end to the node B′ and having its movable tap 25 connected to the base of transistor 15. A resistor 27 connects the other end of potentiometer 23 to reference potential, and an avalanche breakdown device, such as the Zener diode 29, is connected in parallel with the potentiometer 23. Similarly, the biasing network 4 includes the potentiometer 24 coupled to the node A′ and to reference potential through a resistor 28. Movable tap 26 is connected to the base of transistor 16 and the Zener diode 30 is connected in parallel with the potentiometer 24. Thus, from the description which follows hereinafter, it will be apparent that each of the transistors 11 and 12 drives the transistor amplifier 15 and 16, respectively, of its own branch and also controls the conductivity of the transistor amplifier 16 and 15, respectively, of the opposite branch.

Figure 2:
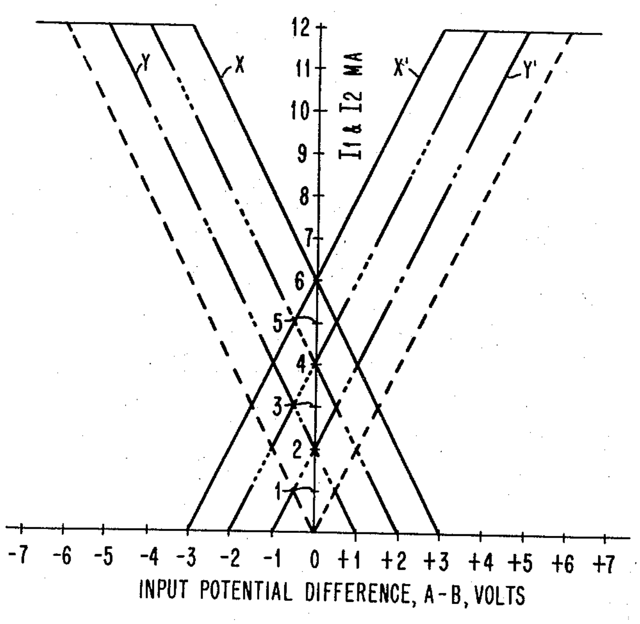
FIGURE 2 is a diagram showing by comparison illustrative control characteristics of a difference amplifier according to the invention and of a conventional difference amplifier.

With reference to FIGURE 2, the intersecting solid lines represent illustrative control characteristics for the conventional difference amplifier, whereas the sets of intersecting broken lines (for example, Y–Y′) represent possible illustrative control characteristics obtainable from the difference amplifier according to the invention. As shown by the lines X–X′, if the maximum amount of current that can be supplied by the current source of a conventional circuit is equivalent to 12 milliamperes (ma.), then during the quiescent condition where there is zero potential difference between the two circuit input signals A and B, approximately 6 ma. of current flow through each branch of the amplifier. (The X line corresponds to the current flowing in the branch receiving the A signal and the X′ line for the branch receiving the B signal.) However, if an error signal is introduced into the circuit, so that the potential difference, A—B volts is a particular value (for example +3 volts) due to the A input signal increasing and the B input signal decreasing a corresponding amount, then the current flowing through the decreasing signal branch (X′ line) increases an amount equivalent to the decrease in the opposite branch (X line). Ultimately, when the potential difference of A—B volts reaches the illustrative +3 volts, then the branch receiving the A signal would be cut off. Correspondingly, the branch receiving the B input signal would have an increased flow of current. This flow would be limited, however, to the maximum current available from the current source. Thus, the maximum current flow during such a phase of operation would be equivalent to twice the quiescent current in any one branch.

The difference amplifier circuit of the invention, on the other hand, has provision for adjusting independently the quiescent current values in each branch. This feature is generally accomplished by the biasing networks 3 and 4 and, specifically, by the potentiometers 23 and 24 of these branches. Each of these potentiometers can be set so as to bias the transistors 15 and 16 to permit balanced operation of the circuit. Equivalent current flow takes place in each branch 1 and 2 (for example 0, 2, 4 or 6 ma. of current flowing in each branch as shown in FIGURE 2).

In the alternative, the potentiometers 23 and 24 may be adjusted to permit the quiescent currents $I_1$ and $I_2$ to be unequal, thereby compensating for any mismatch that exists between the load circuits 19 and 20 or in any other part of the servo loop. However, for either situation, the value of quiescent current in each branch is independent of the current available from a current source. Thus, if the coils of a magnetic amplifier serve as the load circuits, current flow for the proper firing angles of the amplifier coils may be established.

Considering the operation of the circuit further, when the common mode or zero error signal is applied to the circuit, the same voltage values appear at the bases of transistors 11 and 12. Neglecting the base-emitter voltage drops of these transistors, the same values appear at the nodes C, D and A′, B′. When the tap 25 of the potentiometer 23 is at the end common with the node B′, the voltage on the base of transistor 15 and the emitter of transistor 11 (node C) are equal and no current flows through the resistor 17. When tap 25 is set toward the end of potentiometer not in common with node B′, the base of transistor 15 becomes less negative than its emitter and a current is developed in the load circuit 19. This current is proportional to the voltage difference existing between tap 25 and node B′, and the actual current flowing is approximately equal to this voltage difference divided by the resistance of the resistor 17. In similar manner, the current developed in load circuit 20 is established by the setting of tap 26 in relation to node A′. These values of current, therefore, may be set to any value up to the values of the breakdown voltages of the Zener diodes 29 and 30 divided by the resistance of the resistors 17 and 18, respectively.

If an error condition occurs in the servo loop, a differential signal is applied at A and B. As previously noted, these signals appear at C and A′ in response to the A signal and at D and B′ in response to the B signal. Thus, if it is assumed that balanced quiescent current values have been set for each branch of the circuit, then the branch receiving the increasing input signal approaches a cut off conductivity state, and the branch receiving the decreasing input signal develops a greater current flow in its respective load circuit. This current is proportional to the potential difference between the A and B input signals. It is limited only by the voltage and power ratings of the components and the available supply voltage, and, therefore, it may exceed twice the quiescent current value through one branch which is one of the limitations in a conventional difference amplifier. As contrasted with a conventional difference amplifier, which may have provision for unequal collector currents permitting one to increase an amount equivalent to the decrease in the other, this circuit has provision for independent current adjustments to be made in each of the branches.

By way of illustration, if it is assumed that the values of the A and B input signals are each —18 volts in the quiescent state, the resistors 17 and 18 have values of 1000 ohms each, and the potentiometers 23 and 24 are set, so that the voltage bias at the bases of the transistors 15 and 16 are both —16 volts, then 2 ma. of current (lines Y–Y of FIGURE 2) are developed in each of the load circuits. When the A input signal increases to —15 volts, the B input signal decreases to —21 volts. Correspondingly, the bias voltage at the base of transistor 15 decreases to —13 volts and that at the base of transistor 16 increases to —19 volts. It is apparent from the lines Y–Y′ of FIGURE 2 that conductivity is cut off through the branch 1 and has increased in branch 2 to a level substantially greater than twice the quiescent current value in one branch of the circuit.

As already mentioned, the inclusion of the biasing networks and, specifically, the potentiometers 23 and 24 in the circuit permit the branches of the difference amplifier to operate independently. However, the amplifier is still subject to any variations that occur in the common mode signal due to changes in supply voltages. Consequently, the Zener diodes 29 and 30 are included in the biasing networks 3 and 4 and operate in the avalanche breakdown region of their volt-ampere characteristics to compensate for such occurrences. This factor is evident from the explanation of FIGURES 3 and 4 which show a portion of the circuit of FIGURE 1.

In FIGURE 3, the Zener diode 29 and the resistor 27 are eliminated from the circuit, and the potentiometer 23 is represented by the resistors 31 and 32. The current $I_1$ flowing from the load to the transistor 15 is approximately equal to:

$$I_1 \approx \frac{V_C - V_{B'} \times \frac{R_{32}}{R_{31}+R_{32}}}{R_{17}}$$

where $V_C$ and $V_{B'}$ are, respectively, the voltage values at the nodes C and B' and the R's are the resistance values of the resistors indicated by the numerals. If $$V_A = V_C = V_{B'}$$

in the common mode signal condition ($V_A$ is common mode voltage), then:

$$I_1 \approx \frac{VA}{R_{17}} \frac{R_{31}}{R_{31}+R_{32}}$$

It is evident, therefore, if the power supply varies, the common mode input signals varies, and the voltage $V_A$ varies and $I_1$ varies.

Figure 4:
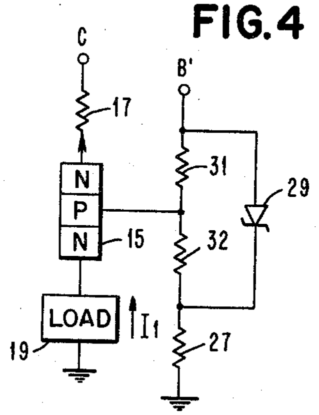

However, as shown in FIGURE 4, where the Zener diode 29 and resistor 27 have been added:

$$I_1 \approx \frac{V_C - \left(V_{B'} - V_Z + V_Z \frac{R_{32}}{R_{31}+R_{32}}\right)}{R_{17}}$$

$$I_1 \approx \frac{V_C - V_{B'}}{R_{17}} + \frac{V_Z}{R_{17}} \times \frac{R_{31}}{R_{31}+R_{32}}$$

where $V_Z$ is the breakdown voltage of the Zener diode. When $V_C = V_{B'}$ in the common mode signal condition:

$$I_1 \approx \frac{V_Z}{R_{17}} \times \frac{R_{31}}{R_{31}+R_{32}}$$

Thus, the current flowing in the load circuit 19 is now dependent upon parameters which are constant, i.e., the breakdown voltage of the Zener diode 29, the resistance of the resistor 17 and the setting of the potentiometer 23 which is represented by the resistances of resistors 31 and 32. Variations of the power supply voltage do not affect this current as long as the absolute magnitude of the voltage at B' is sufficient to keep the Zener diode in the avalanche breakdown region. It is also apparent that the gain or change in the level of this current is linear when the two input signals are not equal, and is not affected by the setting of the potentiometer.

It is readily apparent that although the transistors are shown as being of one type, for example, the transistors 11 and 12 are PNP type transistors and the transistors 15 and 16 are NPN type transistors, their respective conductivity types could be reversed simply by making suitable changes in the polarity of the supply voltages, input signals and the connections of the diodes. Similarly, it is also apparent that the circuit could also employ a transistor or other type of switch connected in the reference circuit to disable the servo loop if required during a particular operation. In such an instance, blocking diodes could be employed to prevent circulating currents which occur due to forward biasing of the collector base junctions of the transistors 15 and 16 by signals applied to the difference amplifier during the disabling operation when this switch would prevent normal current flow.

While this invention has been particularly shown and described with reference to a preferred embodiment thereof, it will be understood by those skilled in the art that the foregoing and other changes in form and details may be made therein without departing from the spirit and scope of the invention.

What is claimed is:

1. A difference amplifier having first and second inputs for responding to a common mode signal condition or to a differential input signal condition, comprising
   first and second amplifying circuit branches for receiving said first and second inputs respectively,
   each of said branches including amplifying means for controlling the current flow in a load circuit according to the conductivity of the amplifying means, and means receiving one of said inputs and applying it to said amplifying means, first means including a bias network coupling the receiving means of said first branch to the amplifying means of the second branch for variably establishing the bias applied to the amplifying means of the second branch to control the conductivity thereof, to render it independent of the conductivity of the amplifying means of the first branch,
   and second means including a bias network coupling the receiving means of said second branch to the amplifying means of the first branch for variably establishing the bias applied to the amplifying means of the first branch to control the conductivity thereof to render it independent of the conductivity of the amplifying means of the second branch,
   so that the current flow in one load circuit is independent of the current flow in the other load circuit and determined by the conductivity of the respective amplifying means when said first and second inputs receive a common mode signal condition or a differential input signal condition.

2. The amplifier of claim 1 wherein each of said networks includes voltage referenced variable resistance means so that the conductivity of each of said amplifying means is proportional to the potential difference between said first and second inputs and the setting of said variable resistance means and independent of the amplifying means of the other branch.

3. The amplifier of claim 2, wherein each of said networks includes a device connected across its respective variable resistance means and operable in the avalanche breakdown region of its volt-ampere characteristic for rendering said first and second circuit branches unaffected by variations in the level of the common mode signal condition.

4. A transistor difference amplifier responsive to first and second differential input signals,
   first and second circuit branches for receiving said first and second input signals respectively,
   each of said branches including a transistor having emitter, base and collector and connected in common base circuit configuration, said collector being connected to drive a load circuit according to the conductivity of said transistor, and means receiving one of said input signals and applying it to said emitter,
   first cross-coupling means including a variable bias network coupling the receiving means of said first branch to the base of the transistor of the second branch, said bias network being set to control the conductivity through said transistor of the second branch independently of the conductivity of the transistor of the first branch,
   second cross-coupling means including a variable bias network coupling the receiving means of said first branch to the base of the transistor of the second branch, said bias network being set to control the conductivity through said transistor, of the first branch independently of the conductivity of the transistor of the second branch,
   whereby the conductivity of said transistors depends on the potential difference between said first and second input signals and the settings of said variable bias networks.

5. The amplifier of claim 4, wherein each of said receiving means includes a transistor of conductivity type opposite to the conductivity type of the common base transistor of the same circuit branch connected as an emitter follower to receive an input signal at its base and to apply it to the emitter of the common base transistor of the same branch and through the respective cross-coupling means to the base of the common base transistor of the other branch.

6. The amplifier of claim 5, wherein each of said variable bias networks includes a potentiometer having a tap for variably adjusting the bias on the respective common base transistor.

7. The amplifier of claim 6, wherein each of said networks includes a device connected across its respective variable resistance means and operable in the avalanche breakdown region of its volt-ampere characteristic for rendering said branches unaffected by variations in the level of a common mode input signal condition.

8. The amplifier of claim 7, wherein each of said devices is a Zener diode.

References Cited by the Examiner

UNITED STATES PATENTS

| | | | |
|---|---|---|---|
| 2,502,822 | 4/50 | Burton | 330—69 X |
| 2,939,018 | 5/60 | Faulkner | 330—24 X |
| 3,050,688 | 8/62 | Heyser | 330—24 |

ROY LAKE, *Primary Examiner.*

NATHAN KAUFMAN, *Examiner.*